Sept. 30, 1924.
S. JENCICK
1,510,281
INDICATING DEVICE FOR INTERNAL COMBUSTION ENGINES
Filed Aug. 30, 1919
2 Sheets-Sheet 1
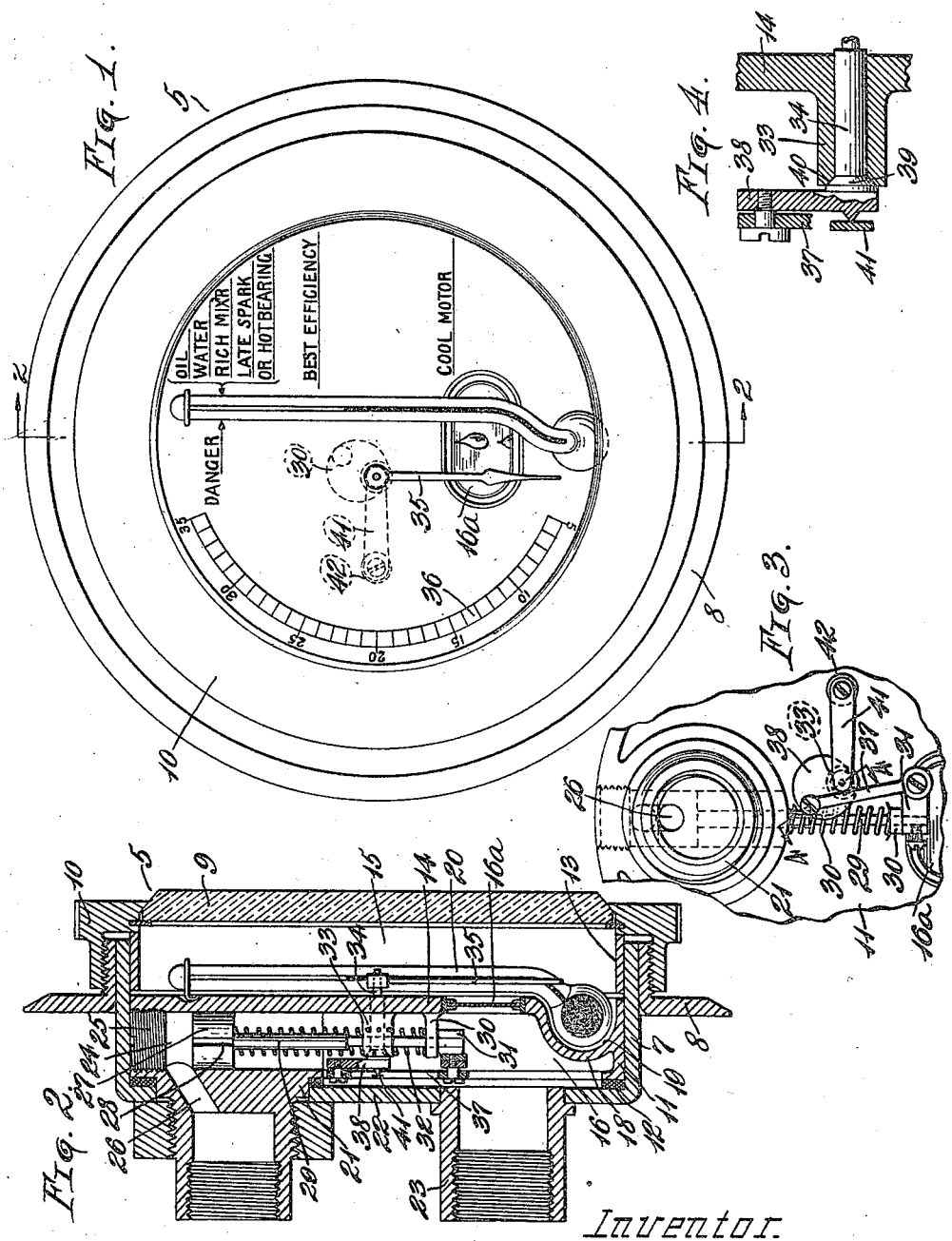

Sept. 30, 1924. 1,510,281
S. JENCICK
INDICATING DEVICE FOR INTERNAL COMBUSTION ENGINES
Filed Aug. 30, 1919 2 Sheets-Sheet 2
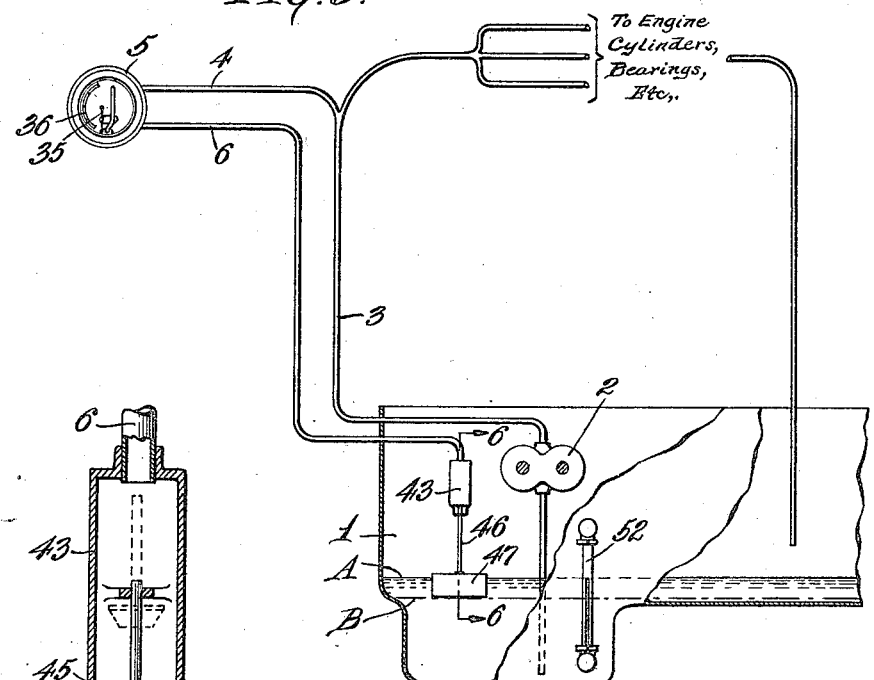
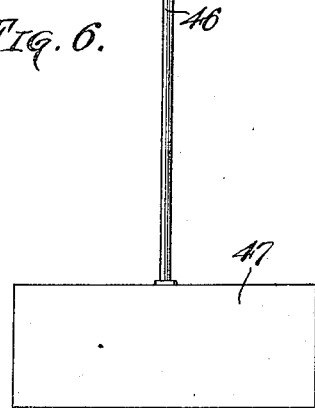
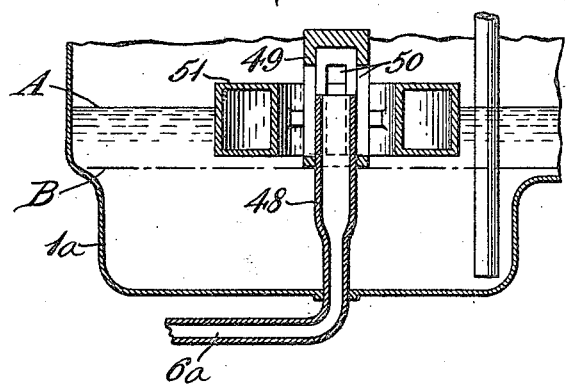
Inventor.
Stephen Jencick
By Brockett & Hyde
Att'ys Patented Sept. 30, 1924.

1,510,281

UNITED STATES PATENT OFFICE.

STEPHEN JENCICK, OF CLEVELAND, OHIO, ASSIGNOR TO GUSTAVUS A. SCHANZE, OF CLEVELAND, OHIO.

INDICATING DEVICE FOR INTERNAL-COMBUSTION ENGINES.

Application filed August 30, 1919. Serial No. 320,958.

*To all whom it may concern:*

Be it known that I, STEPHEN JENCICK, a subject of the Austrian Government, who has declared his intention of becoming a citizen of the United States, residing at Cleveland, in the county of Cuyahoga and State of Ohio, have invented certain new and useful Improvements in Indicating Devices for Internal-Combustion Engines, of which the following is a specification.

This invention relates to indicating devices for internal combustion motors.

In the operation of internal combustion motors it is desirable to indicate to the operator as fully as possible the working condition of the motor system, including the engine itself and the various working parts operated thereby. Indications of the thermal condition of the system are highly desirable, one of the best methods of indicating such thermal conditions being to indicate to the operator the rise and fall of temperature of a circulating liquid used in connection with the motor. One convenient liquid circulation system available for such indications is the circulating system for distributing lubricating oil to the engine cylinders and pistons and the various bearings and other friction producing working parts of the mechanism, for the reason that the efficient operation of the oil circulating system is of primary importance in proper working of the internal combustion motor, so that indications of the working condition of the oil circulating system are equally valuable with indications of its temperature, which temperature indications serve to also indicate other conditions of the motor and working parts of the mechanism.

Among other things it is desirable to indicate the existence of pressure in the lubricating system or, in other words, to indicate that lubricant is flowing through said system, because unless there is some pressure in the system produced either by gravity or the pressure of a pump, the lubricant will not flow. The existence of pressure in the system can be indicated in numerous ways, such as by the ordinary sight feed gage, a pressure gage, or even a thermometer, because a rise of temperature indicated on the thermometer must be consequent upon some flow or circulation of the liquid to the thermometer. The pressure gauge not only indicates flow or existence of pressure but also indicates the degree of pressure and affords information of the quantity of oil flowing or the rate at which it is being supplied to the bearings, cylinders, and other parts. A thermometer or thermal indicating means also produces an indication of the thermal condition of the motor, to wit, its normal efficient working condition and also any abnormal or undesirable working condition of the motor system, such as may be caused by insufficient lubrication of the cylinders, pistons, or bearings, improper mixture of fuel and air, insufficiency of water in the cooling system or stoppage of the flow therein, or improper circulation of air through the radiator, such as caused by a closed radiator shutter, stopping of the fan or the like. All of these abnormal and undesirable conditions should obviously be remedied as soon as it is possible to detect them, and all of said conditions result more or less promptly in rise of temperature in some one or more of the engine parts or the working parts operated thereby. The circulation of lubricating oil over such parts promptly influences the temperature of the oil so that a rise of temperature of said oil, as indicated by a thermometer or other thermal indicator, affords an indication of some abnormal or undesirable condition in the motor system.

It is also desirable and of primary importance to indicate to the operator when his oil supply reaches a dangerously low point. It is not so important to know the exact quantity of oil in the system as it is to know that the quantity of oil has decreased to such a point that replenishment is necessary. Such an indication should preferably be given to the operator not when the oil level has become so low that operation of the engine thereafter may burn out a bearing, or produce other injury, but while there is still enough oil remaining in the reservoir so that reasonable use, with caution and care, may be continued until the oil can be replenished.

The foregoing is particularly applicable to internal combustion engines when used upon motor vehicles, aside from which the use of these indicators upon motor vehicles requires the indicator to be located at such a point as to be constantly in view of the operator while driving the car.

The present invention has therefore for its object to provide means for indicating to the operator the reduction of the quantity of the oil in the lubricating system to a dangerously low amount.

A further object of the invention is to provide indicating means of this character which can be located in position to be constantly visible to the operator of the engine and, in the case of motor vehicles, to the driver of said vehicle while driving the same.

A further object of the invention is to simplify and improve the means for indicating the existence of pressure or flow of lubricant in the lubricating system, and more particularly to avoid leakage of lubricant to exterior parts of the lubricating instrument.

A further object of the invention is to combine in a single instrument oil level indicating means of the character before referred to, with means for indicating some other condition or characteristic of the lubricant or lubricating system, such, for example, as the existence of pressure therein, the degree of pressure, or the temperature.

A further object of the invention is to provide means for indicating the flow or existence of pressure in the lubricating system, together with means cooperatively related thereto for properly affecting said flow indicating means when the level of the lubricant becomes dangerously low so that the flow indicating means then affords an indication of the dangerously low level of lubricant.

A further object of the invention is to provide means capable of application to lubricating systems already in use and which embody flow indicating means, said first-named means when so applied cooperating with the flow indicating means to cause the latter to also serve as an indicator of dangerously low level of lubricant.

Further objects of the invention are in part obvious and in part will appear more in detail hereinafter.

In the drawings, which represent one suitable embodiment of the invention, Fig. 1 is a front elevation of the indicating device; Fig. 2 is a sectional elevation on the line 2—2, Fig. 1, looking in the direction of the arrows; Fig. 3 is a detail elevation from the left in Fig. 2, the rear casing member being omitted to expose interior parts; Fig. 4 is a detail section, on a larger scale, on the line 4—4, Fig. 3; Fig. 5 is a diagrammatic view illustrating the application of the indicator to the lubricating system of an internal combustion engine; Fig. 6 is a detail sectional elevation, on a larger scale, on the line 6—6, Fig. 5; and Fig. 7 is a similar view illustrating a modification.

1 represents the main oil reservoir of an internal combustion engine, either a stationary engine or such an engine as used upon a motor vehicle. In this reservoir is maintained a supply of lubricant which is circulated by a suitable pressure pump 2 through the pipe 3 to the engine cylinders and pistons and to the various shafts and other working parts of the motor system, as is usual, the used oil being returned to reservoir 1. A branch pipe 4 conducts a small portion of the lubricant to the indicating instrument, indicated generally at 5, from which instrument said lubricant is returned to the reservoir through the pipe 6. In a stationary internal combustion engine the indicator 5 may be located at any desirable point visible to the operator of the engine, such as on a part of the engine itself or on an indicating board at some distance from the engine. In a motor vehicle the indicating instrument 5 may be located upon the dash board or at any other point visible to the driver of the car while driving the same, as will be readily understood.

The indicating instrument 5 includes a hollow casing member 7 held in a frame 8 adapted for attachment to a support. The front of said casing is closed by a transparent window 9 held in place by a ring 10. In said casing is located a hollow member 11 sealed to the outer casing by a gasket 12 and held against said gasket by the pressure of the ring 13. This member includes a transverse wall 14 which divides the space within the casing into a front or indicating chamber 15 and a rear oil chamber 16. The wall 14 may be made of transparent material or, if of metal, may be provided with a suitable transparent window 16ª, to enable the flow of oil through the chamber 15 to be observed, as will appear. Said wall also is provided with the rearwardly extending portion 18 forming a recess 19 in the chamber 15 to receive the bulb of a thermometer 20 which is suitably attached to the front face of the wall 17 and extends vertically along the same at one side of window 16ª.

Member 11 is provided with a rearwardly extending tubular member 21 threaded or otherwise adapted for connection to the pipe 4. This member 21 extends out through the rear wall 22 of the casing, and said wall has secured therein a similar tubular member 23 likewise adapted for connection to the pipe 6.

In the rearward extension 21 of member 11 is a laterally extending passage 24 closed at its outer end by a plug 25 and communicating with the pipe 4 by a passage 26. This passage 24 serves as the chamber of a cylinder in which is located a suitable movable abutment 27, such as a diaphragm or piston, the latter being shown, said abutment being provided with a leak port for permitting restricted flow of lubricant thereby, such for example, as the longitudinally extending port or ports 28. The piston rod 29, at its outer end slides in an opening in a boss 30 of member 11 and at its free end has secured thereto a block 31. 32 indicates a light pressure spring normally tending to retract the piston to the position shown in Fig. 2. In an opening of a second boss 33 of member 11 is a rotatable shaft 34 provided in chamber 15 with a hand or pointer 35 traveling over a scale 36 graduated to indicate the degree of pressure. The operating connection between the pointer and piston is as follows:

Block 30 has pivotally connected thereto one end of a link 37, whose opposite end is pivotally connected to an arm or disk 38 attached to the end of shaft 34. Said shaft, just beneath the arm 38, has a conical or tapered valve portion 39 fitting a tapered seat 40 at the mouth of the opening through the boss 33. Said valve is suitably held to its seat such as by a light leaf spring 41 carried by a projection 42 of the member 11.

With the foregoing arrangement, flow of lubricant through the pipe 4 produces pressure in the chamber 24 and depresses the piston 27 in Fig. 2. At the same time some lubricant finds an outlet through the leak port or ports 28 and passes the piston. Nevertheless, the piston is advanced to an amount depending upon the pressure of the lubricant. The advance of said piston moves outwardly the block 31, which, through the link 37 turns the arm 38 and moves the pointer 35 over its scale, thereby indicating the degree of pressure. The scale 36 can of course be calibrated by tests with standard pressures. The connection from the piston to the pointer is of simple form and by positive mechanical means avoids any possible leakage of lubricant from the oil chamber 16 to the indicating chamber 15. Spring 41 holds the valve 39 to its seat with sufficient pressure to avoid leakage and yet allows proper rotation of the pointer without effect upon the indicating ability of the instrument.

Such oil as passes the piston 24 through the bypass ports 28 drops downwardly into the chamber 16, usually flowing down along the piston rod and dropping from the end thereof directly upon the reentrant portion 18 of member 11. It consequently passes across the window 14 so that the operator is afforded a visible indication of the flow of oil. Pointer 35 by its movement also indicates the existence of pressure and at the same time registers the degree of pressure. The flow of oil over the bulge 18 affects the bulb of the thermometer 20 which is enclosed in the recess of said bulb. Consequently the thermometer indicates fairly exactly the temperature of the flowing lubricant and indicates to the operator the thermal or working conditions of the motor to which the lubricant is being supplied. The instrument so far described, therefore, is a combination sight feed, pressure gauge and thermal indicator.

Suitable means is also provided for causing any one or more of these three indicating means to also serve as an indicator of dangerously low level of oil in the main reservoir. For this purpose the delivery pipe 6 which carries the oil back to the reservoir 1 is provided with means sensitive to the level of oil in said reservoir for obstructing the return of oil thereto. For example, in Fig. 6, the delivery end of the pipe 6 is provided with a fairly large hollow casing 43 provided at its lower end with a valve seat 44 to receive a valve member 45 whose rod 46 is carried by a float 47. Float 47 is of fairly large size having sufficient buoyancy so as not to be appreciably affected by the pressure of the oil flowing through the pipe 6.

With this arrangement, as the level of oil lowers, the float 47 drops until finally it reaches a position where the valve 45 reaches its seat 44, thereby closing the outlet from the pipe 6. The parts are so adjusted or located that this position is reached when the level of oil in the reservoir is such that replenishment is necessary, as before stated. The closure of the outlet from pipe 6 traps the oil between the pump and the valve 45. Consequently all further flow through pipes 4 and 6 stops. In this condition the pressures above and below the piston 24 are equalized and the spring 32 returns the pointer 35 to its initial or zero position. At the same time the flow of oil past the window 14 stops and if the condition persists for an appreciable period the temperature of oil in chamber 16 drops and a drop in temperature is indicated on the thermometer. As a consequence, with this system, any otherwise unexplained indication of fall of temperature, of filling up of the chamber 16 and failure of sight indication of flow of oil, or the return of the hand 35 to zero position, indicates that the level of oil is dangerously low and should be replenished.

Fig. 7 indicates a modification in which the delivery pipe 6ª returns the oil to the reservoir 1ª through the upwardly extending portion 48, surrounding which is a hollow sleeve 49 provided with side openings 50 and supported by a fairly heavy float 51. With this arrangement the return of oil to the reservoir is cut off by closure of the ports 50 when the float drops. The arrangement does away with a positively seating valve and the liability of chattering of the valve as it approaches its seat. Float 51 is made heavy enough so that it will not be appreciably lifted from the oil by the pump pressure. Other arrangements may obviously be used for the same purpose.

It is of course to be understood that the indicator hereinbefore described for indicating dangerously low level of oil may be employed and usually will be employed in connection with some other indicator 52 of ordinary form which constantly indicates the actual level of oil in the reservoir. Such an indicator, for example on a motor vehicle, may be under the engine hood or otherwise accessible at any time to advise the driver how much oil is in the reservoir or as to the amount necessary to replenish the supply to the required normal quantity. My improved oil indicator, however, is located where it is always visible to the driver, even while running the car, and serves as a warning to promptly advise him of dangerously low level of the oil.

While in the present application the valve mechanism sensitive to the oil level is located on the discharge side of the gauge or, in other words between the gauge and the outlet therefrom to the reservoir, said valve mechanism may obviously be located in other places, at any place in fact where it is effective upon the gauge. For example, in my copending application for oil circulating and indicating system for internal combustion engines, Serial No. 320,957 filed August 30, 1919, the valve mechanism is located between the pump and gauge, and reference may be had to said copending application for a more complete description of this arrangement, which is understood to be a part of the present invention.

What I claim is:—

1. The combination with a motor of a motor vehicle, of the usual oil circulating system therefor, means for indicating the existence of pressure in said system, and means additional to said circulating system and cooperatively associated with said indicating means whereby the latter also serves as an indicator of low oil level in said system.

2. The combination with a motor of a motor vehicle, of the usual oil circulating system therefor, means for indicating the existence of pressure in said system, and means additional to said circulating system sensitive to the level of oil therein and cooperatively associated with said indicating means whereby the latter also serves as an indicator of low oil level in said system.

3. The combination with a motor of a motor vehicle, of the usual circulating system therefor, a flow indicator for said system, and means additional to said circulating system and cooperatively associated with said indicating means whereby the latter also serves as an indicator of low oil level in said system.

4. The combination with a motor of a motor vehicle, of the usual circulating system therefor, a flow indicator for said system, and means additional to said circulating system sensitive to the level of oil therein and cooperatively associated with said indicating means whereby the latter also serves as an indicator of low oil level in said system.

5. The combination with a motor of a motor vehicle, of the usual oil circulating system therefor, a pressure indicator for said system, and means additional to said system and cooperatively associated with said pressure indicator for equalizing the pressures across the same.

6. The combination with a motor of a motor vehicle, of the usual oil circulating system therefor, a pressure indicator for said system, and means additional to said system and cooperatively associated with said pressure indicator for automatically equalizing the pressures across the same.

7. The combination with a motor of a motor vehicle, of the usual oil circulating system therefor, a pressure indicator for said system, and means additional to said system and arranged when the oil level therein becomes dangerously low to trap oil at said indicator and cause the same to become inoperative, thereby indicating approaching low oil level.

8. The combination with a motor of a motor vehicle, of the usual oil circulating system therefor, a pressure indicator for said system, and valve means additional to said system controlled by the oil level therein and adapted to be actuated before the level of oil becomes dangerously low to cause said indicator to indicate approaching low level of oil.

9. The combination with a motor of a motor vehicle, of the usual oil circulating system therefor, an indicator for indicating some essential quality of the circulating system, means for circulating the oil from said system to said indicator to thereby produce such indication, and means additional to said system and cooperatively associated with said indicator for affecting circulation of oil thereto and causing the same to produce additional indication.

10. The combination with a motor of a motor vehicle, of the usual oil circulating system therefor, an indicator for indicating some essential quality of the circulating system, means for circulating the oil from said system to said indicator to thereby produce such indication, and means additional to said system controlled by the level of oil in said system and cooperatively associated with said indicator for affecting the circulation of oil thereto and causing the same to produce additional indication.

11. In a motor vehicle, means for producing an indication of some essential quality of the engine and additional means associated therewith and adapted for actuation before the oil level becomes dangerously low to cause said indicating means to indicate approaching low level of oil.

12. In a motor vehicle, means for indicating the temperature of the engine, and means controlled by the level of oil in the lubricating system and adapted for actuation before the oil level becomes dangerously low and associated with said indicating means to cause the same to indicate approaching low level of oil.

13. In a motor vehicle, an oil circulating system for the motor, a flow indicator for said system, means for indicating the temperature of the motor, and means additional to said system and associated with said flow and temperature indicating means for causing the same to indicate low level of oil.

14. In a motor vehicle, an oil circulating system for the motor, an instrument for indicating the temperature of the motor and the pressure of oil in said system, and means additional to said system and controlled by the oil level therein and associated with said instrument for causing the same to produce an additional indication of approaching oil level.

15. In a motor vehicle, an oil circulating system for the motor, an instrument for indicating some essential quality of the engine, and means adapted upon approaching low level of oil in said system to interrupt the flow of oil from said instrument to the oil reservoir and thereby cause the same to indicate approaching low level of oil.

16. In a motor vehicle, an oil circulating system, including an indicating instrument to which the oil is circulated and returned therefrom and means controlled by the level of oil in said system for cutting off the return of oil from said indicator.

In testimony whereof I affix my signature.

STEPHEN JENCICK.